United States Patent [19]

Bohm

[11] 4,329,594
[45] May 11, 1982

[54] PIVOTAL AND SLIDABLE AUTO ROOF COVER

[75] Inventor: Horst Bohm, Frankfurt am Main, Fed. Rep. of Germany

[73] Assignee: Rockwell-Golde, a Gesellschaft mit beschrankter Haftung, Frankfurt am Main, Fed. Rep. of Germany

[21] Appl. No.: 140,401

[22] Filed: Apr. 14, 1980

[30] Foreign Application Priority Data

Apr. 12, 1979 [DE] Fed. Rep. of Germany ....... 2914864

[51] Int. Cl.³ .............................................. B60J 7/00
[52] U.S. Cl. .................................. 307/10 R; 318/266; 318/282; 318/468; 318/467
[58] Field of Search ................. 307/10 R, 9; 318/266, 318/466, 467, 468, 282

[56] References Cited
U.S. PATENT DOCUMENTS 2,755,423  7/1956  Hager .............................. 318/468 X
3,702,430  11/1972  Knetsch .............................. 318/468

*Primary Examiner*—Michael L. Gellner
*Assistant Examiner*—James L. Dwyer

[57] ABSTRACT

An apparatus for actuating a slidable and pivotally movable cover for use with an automobile roof opening comprises a control element, e.g. a disc, driven by an electric motor. A plurality of switch cones are preferably secured at equal radial distances from the rotational axis of the control disc. An actuating plunger is radially displaceable by each cam to move a biased actuating element which then operates a switching member of a control switch. This switches off the motor when specific portions of the cover are reached.

In a first position of the actuating element, in which it is held against its bias by energized electromagnetic means, the actuating element is operable to displace the switch pin to switch off the motor. In a biased second position of the actuating element, with the electromagnetic means de-energized in consequence of the motor being switched off, the actuating element holds the switching member in its displaced position until the energizing circuit is again energized.

14 Claims, 6 Drawing Figures

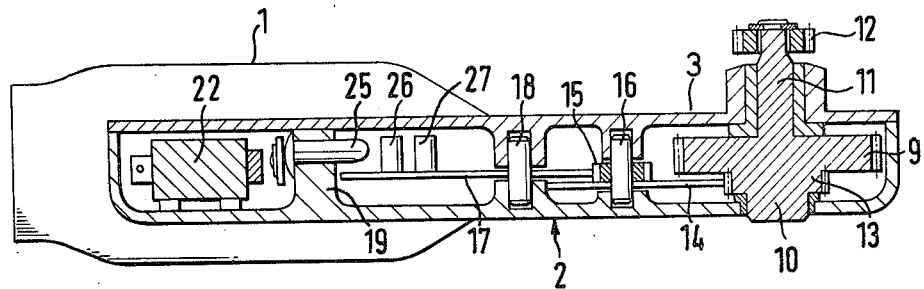
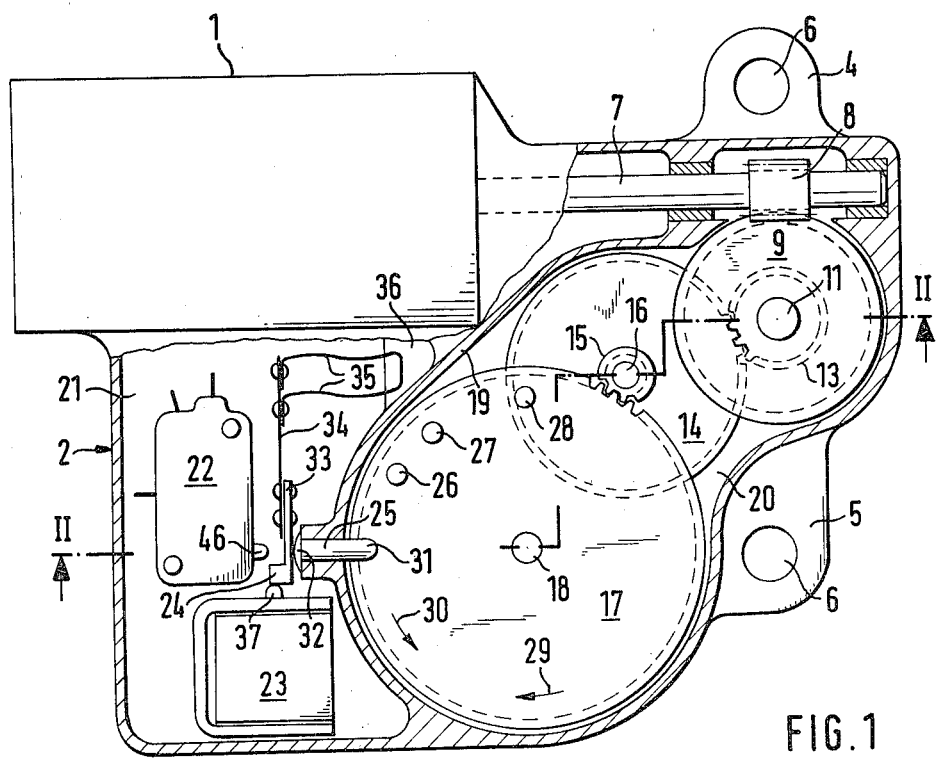

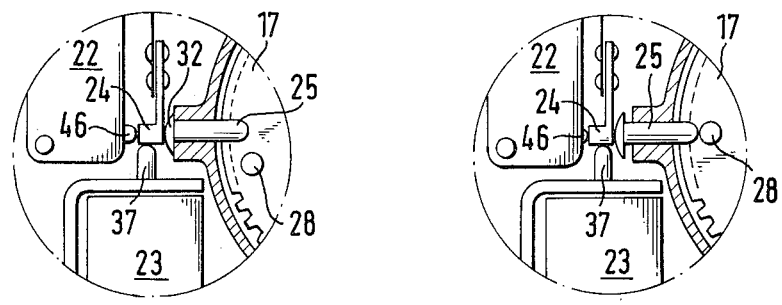
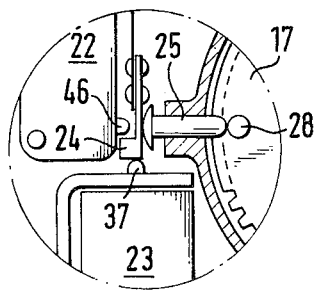
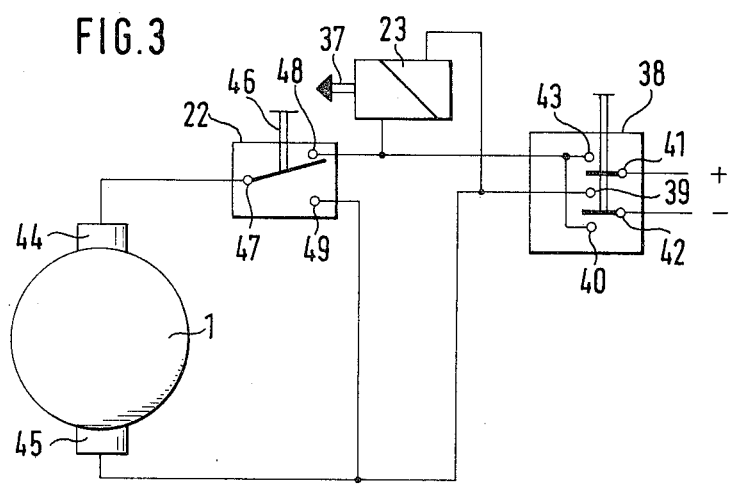

PIVOTAL AND SLIDABLE AUTO ROOF COVER

This invention relates to an apparatus for the actuation of an automobile roof cover which is slidable and pivotally movable. One known such apparatus comprises a reversible electric motor arranged to drive, via a reduction gear, a toothed pinion which is arranged to drive the cover by means of thrust-transmittingly guided, flexible, threaded cables, wherein a pole-reversing switch which is arranged to automatically return to its neutral position is provided for reversing the direction of the electric motor, and wherein a control element arranged to be moved by the electric motor for the switching-off of the motor when specific positions of the cover are reached, and a control switch is provided in one of the connecting lines between the motor and the pole-reversing switch.

In this known apparatus an impulse relay is provided which is controlled by a switch which is actuated via a control device driven by the motor. In this known arrangement, the motor is indeed automatically switched off via the control device, the thereby actuated switch and the impulse relay at the end of the two possible opening movements of the cover, i.e. when its maximum pivoted-out position is reached and when its maximum displaced position is reached, but no automatic switching-off of the motor is carried out at the closed position of the cover. The stopping of the motor is instead caused by a releasing of the pole-reversing switch when the cover has reached a travel-limiting stop. In order to prevent a "stalling" of the motor, a slip coupling is provided, which comes into effect until the motor is switched off.

Embodiments of the present invention seek to provide an apparatus for actuating the cover, wherein the motor is automatically switched off both when the closed position is reached and also when its two maximum opening positions are reached, and wherein the motor, in spite of having previously been automatically switched off, can again be set in motion by actuating of the pole-reversing switch when a further movement of the cover is desired.

According to the invention there is provided an apparatus for actuating an automobile roof cover which is slidable and pivotally movable, comprising a reversible electric motor for connection to means for driving a cover of an automobile roof, an energising circuit for the motor including a control switch and a reversing switch for energizing the motor and selecting the opening and closing directions of rotation of the motor, a control element operatively connected to said motor and having a plurality of cam surfaces each associated with a specific position of the cover in which the motor is to be de-energized by means of the control switch, an actuating member at a fixed location relative to the control element and arranged to be displaced by each cam surface when that cam surface is positioned at said fixed location, an actuating element displaceable by the actuating member, said control switch having a switching member displaceable by the actuating element and operable, when the switching member is displaced by the actuating element, to de-energize the motor, resilient biasing means to bias the actuating element to urge the actuating member into the path of the cam surfaces and also to bias the actuating member relative to the switching member, electromagnetic means in the energizing circuit which, when energized, displaces the actuating element against the bias acting on the actuating member relative to the switching member, wherein, in a first position of the actuating element, in which it is held by the energized electromagnetic means, the actuating element is operable to displace the switching member and thereby cause the control switch to de-energize the motor in response to displacement of the actuating member by a said cam surface, and wherein in a second position of the actuating element, in which it is biased by the biasing means with the electromagnetic means de-energized in consequence of the de-energization of the motor, the actuating element holds the switching member in its displaced position until the energizing circuit is again energized.

Suitably, the means for connection of the cover to the reversible electric motor include a toothed pinion driven by the motor via a reduction gear, said toothed pinion driving the cover by means of thrust-transmittingly guided, flexible threaded cables.

Preferably, said reversing switch is manually operable and is resiliently biased to return to a neutral position in which the energizing circuit is de-energized.

In one embodiment, the control comprises a rotatable disc driven by said motor via reduction gearing and said cam surfaces are located at equal radial distances from the rotational axis of the disc and the arc distances between the cam surfaces are proportional to the cover displacements to be controlled.

The cam surfaces may be cams attached to the disc.

The actuating member may be an actuating plunger which is radially displaceable relative to the control disc and arranged at a fixed circumferential location relative to the control disc.

Suitably, the resilient biasing means biases the actuating element in one direction to urge the actuating plunger into the path of the cam surfaces and also biases the actuating member transversely to said one direction towards said electromagnetic means.

The electromagnetic means may comprise an induction coil with a core, the induction coil being arranged in said energizing circuit, the core co-operating with the actuating element to maintain the actuating element in its second position when the induction coil is energized.

The core may have a pin associated therewith, said pin acting on the actuating element when the induction coil is energized.

By the co-operation, to be explained below, between the cam surfaces, the actuating member, the actuating element, the control switch and the core, the motor is automatically switched off reliably when the limiting positions of movement of the cover are reached, even if the reversing switch remains actuated. Before renewed actuation of the cover, however, the reversing switch must be deactuated before a further movement of the cover in the desired direction can be initiated by once again actuating the reversing switch. On account of the automatic stopping of the motor when the limiting positions of the cover are reached, a slip coupling is not required.

Preferably, the assembly is so arranged that the control element is formed as the last pinion of a multi-stage spur wheel reduction gear and carries at least three said cam surfaces formed as spaced-apart switch cams, of which one is associated with the closed position of the cover and one each are associated with the maximum pivoted-out position and the maximum displaced position. By the forming of the control element as the last pinion of a multi-stage spur wheel reduction gear, on the one hand relatively clear distances between the switch cams mounted thereon are rendered possible and on the other hand a relatively slow rotational movement of the control element takes place. As a result of these relationships, the relevant motor switching-off points can be very precisely determined, so that the stopping of the motor is carried out accurately when the cover has reached its desired limiting position.

Switch cams for determining intermediate positions of the cover may also be fixed to the control element. These additional switch cams cause a termination of the movement of the cover when predetermined intermediate positions are reached. If the cover is to be moved onwards, this can be carried out by simple renewed actuation of the reversing switch. This possibility is of especial importance for the only short pivoting-out travel of the cover. If intermediate positions are provided from the outset by appropriate provision of switch cams, then desired magnitudes of pivoting-out movement can be automatically obtained, whereas with a simple stopping of the motor when the maximum pivoting-out position of the cover has been reached, it is difficult to achieve a proper setting of intermediate positions, on account of the short adjustment distances to be travelled at a comparatively high adjustment speed.

The two-directionally spring-loaded arrangement of the actuating element can favourably be realized by the actuating element being secured to a leaf spring, which is in turn secured to a stationarily mounted parallel leaf spring assembly.

In a further embodiment of the invention, provision is made for the control switch to be formed as a microswitch and to possess a second contact which, when the switching member is displaced by the actuating element, short-circuits the two terminals of the motor. The use of a microswitch offers the advantage that only very short contact travels are necessary, so that the switching operations take place with corresponding rapidity. The provision of a second contact which, when the motor is switched off, immediately becomes effective offers the advantage that the still slightly onward-running motor electrically brakes itself on account of its generator action when its terminals are short-circuited.

For an apparatus according to this invention, a very compact flat form of construction can be achieved if the reduction gear for the toothed pinion and the reduction gear, driven therefrom, for the control element are disposed in one chamber of a housing sub-divided by a partition wall into two chambers and connected to the motor, while in the other housing chamber the control switch, the electromagnetic means, the actuating element and the associated connecting cables are mounted, the actuating member being guided slidably in the chamber partition wall.

An embodiment of the invention will now be described by way of example with reference to the accompanying drawings in which:

FIG. 1 is a cut-away plan view of an apparatus embodying the invention,

FIG. 2 is a section along II—II in FIG. 1,

FIG. 3 is the electrical circuit forming the basis of the apparatus, and

FIGS. 4 to 6 are part views, similar to FIG. 1, illustrating the co-operation between the essential elements of the apparatus.

To explain the basic mechanical construction of the apparatus, reference will first be made to FIGS. 1 and 2.

As is apparent here, the housing referenced generally 2 is connected by means of a flange (not shown) to an electric motor 1, having terminals 44, 45 (FIG. 3), which motor 1 is formed as a reversible direct current motor of flat construction. The arrangement may favourably be such that the housing of the motor and the housing 2 are formed as one integral housing, the housing being closed by a cover 3. The mounting of the apparatus is effected by fixing bores 6, provided in housing projections 4 and 5.

On the armature shaft 7 of the motor, there is a drive worm 8, rotationally keyed thereto, which is in engagement with a worm pinion 9. The worm pinion 9 is rotatably journalled in the housing 2 and the cover 3 by journals 10 and 11. The journal 11 is continued outwards and carries, at its outer end, a toothed pinion 12, keyed thereto. This toothed pinion 12 is in driving engagement in known manner with the thrust-transmittingly guided flexible threaded cables for the purpose of actuating the cover (not shown) for the roof opening (not shown). To the worm pinion 9, a pinion 13 is firmly connected, which engages with an intermediate wheel 14 of larger diameter. Coaxial with this intermediate wheel and firmly secured to it is a pinion 15 of smaller diameter. Intermediate wheel 14 and pinion 15 are together journalled in the housing 2 and cover 3 by a shaft 16. The pinion 15 is in driving engagement with a control element which may be in the form of a control disc 17, toothed at its outer periphery, which is likewise rotatably journalled in the housing 2 and the cover 3 by means of a shaft 18. It can be seen that the diameters visible from FIG. 1 of the components of the described spur wheel gear provide a considerable speed reduction, so that the control disc 17 rotates only comparatively slowly when the motor 1 is running. On account of the lubrication to be provided for the spur wheel gear, there is a partition wall 19 bounding the spur wheel gear in the housing 2 and sub-dividing the housing 2 into chambers 20 and 21. In the chamber 21 are the switching and actuating elements, to be described in more detail later, namely a control switch 22 having contacts 47, 48 and 49 (FIG. 3) constructed here as a microswitch, electromagnetic means, which is here an induction coil 23, an actuating element 24 and an actuating member, in this embodiment, a plunger 25, guided so as to be longitudinally displaceable in the partition wall 19. In the example illustrated, there are situated on the control disc three switch cams 26, 27 and 28, fixed thereto. The switch cam 26 marks the closed position of the cover for the automobile roof opening, the switch cam represents the maximum pivoted-out position of the cover, and the switch cam 28 is associated with the maximum displaced position of the cover. The switch cams 26 to 28 are indicated in FIG. 1 relative to the actuating plunger 25 in an intermediate position, in which the cover is situated in a displaced position adjacent to the closed position. The arrow 29 indicates the rotational direction of the control disc 17 during an opening displacement of the cover. The arrow 30 indicates, by contrast, the direction of rotation of the control disc 17 during the outward pivoting movement of the cover. The closure displacement self-evidently takes place also in the direction of arrow 30, while the inward pivoting movement of the cover takes place in the direction of the arrow 29. It can be seen that, during the outward pivoting movement of the cover, only a small distance needs to be travelled between the two switch cams 26 and 27 in the anti-clockwise direction, i.e. in the direction of arrow 30, whereas during the opening displacement of the cover in the clockwise direction, i.e. in the direction of arrow 29, a considerable distance of travel is present between the switch cams 26 and 28.

As FIG. 1 furthermore illustrates, the actuating plunger 25 when situated in its rest position penetrates by means of its inner end 31 into the path of movement of the switch cams 26 to 28. When one of these switch cams runs onto the end 31 of the actuating plunger 25, this plunger is displaced outwards, i.e. into the housing chamber 21, displacing by means of its head 32 the actuating element 24. The actuating element 24 is attached by means of an extension 33 to a leaf spring 34, which is firmly connected by means of its free end to a parallel leaf spring assembly 35. The other end of the parallel leaf spring assembly 35 is fixed to a spring abutment 36 mounted in the housing 2. Referred to the position of the components shown in FIG. 1, the springs 34 and 35 have the effect in co-operation that the actuating element 24 is prestressed to the right and downwards as viewed in FIG. 1. At its lower end as shown in FIG. 1 the actuating element 24 bears against a guide pin 37, which is firmly connected to the displaceable core (not shown) of the induction coil 23.

To explain the electrical circuit, reference is now made to FIG. 3. A pole-reversing switch 38 visible here is illustrated in its neutral position, into which it automatically returns at the termination of its actuation. The pole-reversing switch 38 having contacts 39, 40, 41, 42 and 43 can be connected to a direct current source by pressure exerted by the switching element of the switch 38 against the contacts 39 and 40 for the purpose of forming a connection with the contacts 41 and 42. A pull on the switching element of the switch 38 results in its bearing against the contacts 43 and 39. In practice, however, the pole-reversing switch may favourably be formed as a flip-flop switch. The control switch 22 is connected into the connecting line between the switch contact 43 and the motor terminal 44. The motor terminal 45 is connected to the contact 39. The induction coil 23 is connected to the contacts 43 and 39, i.e. it is in parallel with the motor 1. The control switch 22 is always in the closed position illustrated here when its switch pin 46 is not pressed in. The switch contacts 47 and 48 are here shown bridged across. If the switch pin 46 is pressed in, then a connection is formed between contact 47 and the second switching contact 49, causing the motor terminals 44 and 45 to be short-circuited.

If the pole-reversing switch 38 is actuated by pulling or pushing its switching element, then the motor 1 and also the induction coil 23 are energized. The guide pin 37 of the induction coil 23 is thereby extended and displaces the actuating element 24 until the latter is situated between the switch pin 46 and the head 32 of the actuating plunger 25. This position of the components is shown in FIG. 4.

If actuation of the pole-reversing switch 38 is continued, the motor 1 drives the cover in the desired direction of movement or pivoting until the control disc 17, simultaneously rotationally driven through the described spur wheel gear, has moved a switch cam, for example the switch cam 28, up to the location of the actuating plunger 25. The switch cam 28 pushes the actuating plunger 25 to the left (FIG. 5), causing the control switch 22 to be opened by pressing-in of switch pin 46 by means of the actuating element 24. Thus the motor is switched off and simultaneously is electrically braked by short-circuiting of its terminals.

If the pole-reversing switch 38 is now released, the induction coil 23 becomes de-energized, so that starting from the position of the parts illustrated in FIG. 5, the actuating element 24 is displaced downwards by the action of the springs described above until it adopts the position shown in FIG. 6. Here the actuating element 24 frees the switch pin 46 of the control switch 22, the actuating element extending over and bearing against the outward-springing switch pin 46 in the manner illustrated in FIG. 6. The actuating plunger 25 is here still in its extended position, because the springs acting upon the actuating element 24 cannot push in the actuating plunger on account of the switch cam 28 still situated behind it.

If, starting from the position of the parts illustrated in FIG. 6, the motor 1 is now again set in motion, then the pole-reversing switch 38 is actuated in the desired manner for the one or other rotational direction of the motor. The induction coil 23 is here indeed also immediately energized, but it cannot extend its guide pin 37 because initially the actuating element 24 still bears against the switch pin 46. The immediately onward-running motor, however, drives the control disc 17, so that the switch cam 28 releases the actuating plunger 25. The spring-loaded actuating element 24 now displaces the actuating plunger 25 into its rest position, whereby the engagement between switch pin 46 and actuating element 24 is removed so that the induction coil 23 can now extend its guide pin 37. The guide pin 37 now once again displaces the actuating element 24 against the force of the springs acting thereon into the position shown in FIG. 4. In this position of the components, the motor 1 drives the cover until once again a switch cam acts upon the actuating plunger 25.

I claim:

1. Apparatus for actuating an automobile roof cover which is slidable and pivotally movable, comprising a reversible electric motor for connection to means for driving a cover of an automobile roof, an energising circuit for the motor including a control switch and a reversing switch for energizing the motor and selecting the opening and closing directions of rotation of the motor, a control element operatively connected to said motor and having a plurality of cam surfaces each associated with a specific position of the cover in which the motor is to be de-energized by means of the control switch, an actuating member at a fixed location relative to the control element and arranged to be displaced by each cam surface when that cam surface is positioned at said fixed location, an actuating element displaceable by the actuating member, said control switch having a switching member displaceable by the actuating element and operable, when the switching member is displaced by the actuating element, to de-energize the motor, resilient biasing means to bias the actuating element to urge the actuating member into the path of the cam surfaces and also to bias the actuating member relative to the switching member, electromagnetic means in the energizing circuit which, when energised, displaces the actuating element against the bias acting on the actuating member relative to the switching member, wherein, in a first position of the actuating element, in which it is held by the energized electromagnetic means, the actuating element is operable to displace the switching member and thereby cause the control switch to de-energize the motor in response to displacement of the actuating member by a said cam surface, and wherein in a second position of the actuating element, in which it is biased by the biasing means with the electromagnetic means de-energized in consequence of the de-energization of the motor, the actuating element holds the switching member in its displaced position until the energizing circuit is again energized.

2. Apparatus as claimed in claim 1, wherein the means for connection of the cover to the reversible electric motor include a toothed pinion driven by the motor via a reduction gear, said toothed pinion driving the cover by means of thrust-transmittingly guided, flexible threaded cables.

3. Apparatus as claimed in either claim 1 or claim 2, wherein said reversing switch is manually operable and is resiliently biased to return to a neutral position in which the energizing circuit is de-energized.

4. Apparatus as claimed in claim 1, wherein the control element comprises a rotatable disc driven by said motor via reduction gearing and said cam surfaces are located at equal radial distances from the rotational axis of the disc and the arc distances between the cam surfaces are proportional to the cover displacements to be controlled.

5. Apparatus as claimed in claim 4, wherein the cam surfaces are cams attached to the disc.

6. Apparatus as claimed in claim 4, wherein the actuating member is an actuating plunger which is radially displaceable relative to the control disc and arranged at a fixed circumferential location relative to the control disc.

7. Apparatus as claimed in claim 6, wherein the resilient biasing means biases the actuating element in one direction to urge the actuating plunger into the path of the cam surfaces and also biases the actuating member transversely to said one direction towards said electromagnetic means.

8. Apparatus as claimed in claim 1, wherein said electromagnetic means comprises an induction coil with a core, the induction coil being arranged in said energizing circuit, the core co-operating with the actuating element to maintain the actuating element in its second position when the induction coil is energised.

9. Apparatus as claimed in claim 8, wherein the core has a pin associated therewith, and said pin acts on the actuating element when the induction coil is energized.

10. Apparatus according to claim 1, wherein the control element is formed as the last pinion of a multi-stage spur wheel reduction gear and carries at least three said cam surfaces formed as spaced-apart switch cams, one of which is associated with the closure position of the cover and one with the maximum pivoting-out position of the cover and one with the maximum displacement position of the cover.

11. Apparatus according to claim 10, wherein cam surfaces for determining intermediate positions of the cover are also fixed to the control element.

12. Apparatus according to claim 1, wherein the actuating element is secured to a leaf spring, which in turn is secured to a stationarily mounted parallel leaf spring assembly.

13. Apparatus according to claim 1, wherein the control switch is formed as a microswitch and possesses a second contact which, when the switching member is displaced by the actuating element, short-circuits the two terminals of the motor.

14. Apparatus according to claim 4, wherein the reduction gear for the toothed pinion and the reduction gear, driven thereby, for the control element are disposed in a chamber of a housing divided by a partition wall into two chambers and connected to the motor, while in the other housing chamber, the control switch, the electromagnetic means, the actuating element and the associated connecting cabling are mounted, the actuating member being slidably guided in the chamber partition wall.

* * * * *